(No Model.)
J. P. BLACK.
STALK CUTTER MACHINE.
No. 435,535. Patented Sept. 2, 1890.
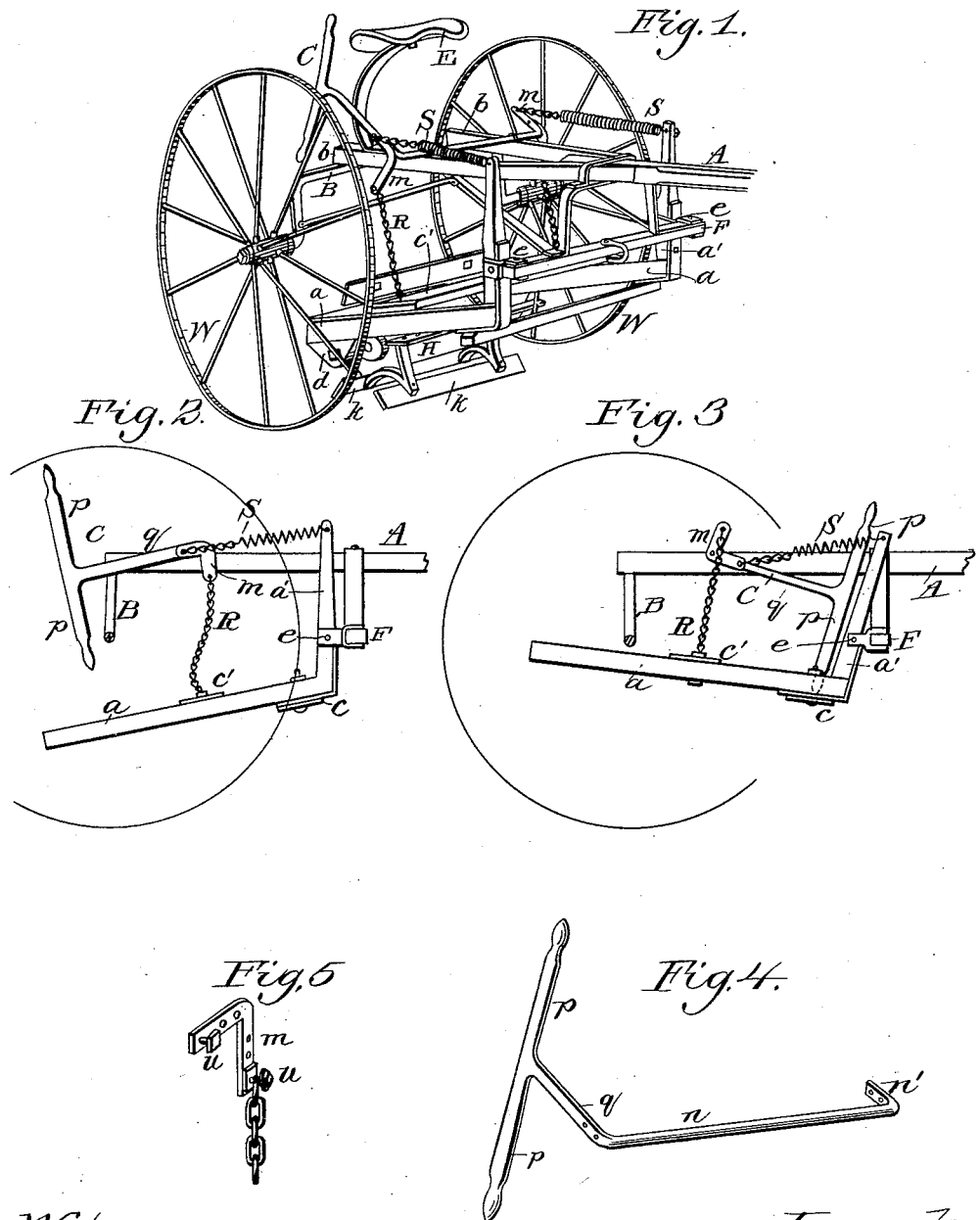
Witnesses
Charles Lane
M. F. Goodrich
Inventor
Joseph P. Black,
by John Lane,
His Attorney.

UNITED STATES PATENT OFFICE.

JOSEPH P. BLACK, OF ALTON, ILLINOIS, ASSIGNOR TO THE HAPGOOD PLOW COMPANY, OF SAME PLACE.

STALK-CUTTER MACHINE.

SPECIFICATION forming part of Letters Patent No. 435,535, dated September 2, 1890.

Application filed January 2, 1890. Serial No. 335,629. (No model.)

*To all whom it may concern:*

Be it known that I, JOSEPH P. BLACK, a citizen of the United States, residing at Alton, in the county of Madison and State of Illinois, have invented a new and useful Improvement in Stalk-Cutting Machines, of which the following is a specification.

My invention relates to stalk-cutting machines having a carriage on wheels, with a means for elevating the cutters above the ground, and has the object to provide a machine of less cost, lighter weight, yet of greater power and effectiveness, and also of lighter draft and of greater ease in handling and operating than heretofore; and it consists in providing a spring exerting its force as a weight upon the cutters when the machine is in a working position, and its exerting force changed to assisting to elevate the cutters above the ground when desired to elevate the cutters, and also in the construction and adaptation of parts, as hereinafter set forth, shown, and claimed.

Referring to the drawings, like letters refer to like parts in all the figures, in which—

Figure 1 is a perspective view of a stalk-cutting machine embodying my invention as when in a position of rest. Fig. 2 is a side elevation view of parts of same, showing the position of parts as when the machine is in a working position. Fig. 3 is the same view as in Fig. 2, with parts moved and showing as when the cutters are elevated above the ground. Fig. 4 is a perspective view of the lever C, and Fig. 5 is a perspective view enlarged of the lever-arm $m$.

The carriage may consist of the tongue A, with hounds $b$, axle B, with wheels W, the seat E, and the draft-bar F, all of any ordinary construction, to which my improvements may be attached.

The cutter-frame may consist of the side bars $a$, with the uprights $a'$, the bottom rail $c$, the top rail $c'$, and the boxes $d$, carrying the cutter-head H, having a series of knives or cutters $k$, and pivotally connected to the carriage by the clevis $e$, attached to the draft-bar F, as shown, all of ordinary construction, except as modified, and adapted to embrace my improvements.

In adapting the cutter-frame for use with my improvements it is a part of my invention to extend the uprights $a'$ upwardly some distance above the draft-bars F, and they may preferably extend to above the tongue of the carriage to have the spring S, attached to the uprights, high above the pivotal connection, for leverage, as shown.

C represents the lever, which may be of iron or steel and consist of the central part $n$, rounded and extending across the carriage-frame or hounds $b$, having a pivotal connection therewith, and having at one end the stub $n'$, and at the other end the long arm $q$, extending upwardly or outwardly and provided with the cross-arm $p$, extending at either side, as shown in Figs. 1 and 4.

$m$ represents the short arm of the lever C, preferably made separate therefrom and rigidly attached to the lever C with bolts or rivets, and may consist of a bar of iron bent at or near its center, either part forming a right angle thereabout with the other part, and the ends may be provided with the outwardly-extending wrist-pins $u$, for connecting the suspension-chain and spring.

R represents the suspension-chain, which may consist of any ordinary linked chain, having its bottom end connected to the cutter-frame and its top end attached to the arm $m$ by the pin $u$, as shown.

S represents the spring, which may preferably consist of the ordinary steel spiral as wound about a center, having one end connected to the top end of the upright $a'$, and the other end connected to the lever C, either through the pin $u$ and arm $m$ or directly attached to the lever-arm $q$, as will be understood by the drawings. At one end of the spring may be a short chain as a means whereby the spring may be adjusted in power by taking up or letting out the length of the spring, as will be understood by inspecting the drawings.

It will be observed that preferably there may be a spring, suspension-chain, and lever-arms upon either side of the machine and connected to the lever, as shown.

In operation the lever is shown in Fig. 1 as when in a position of rest, in which position the force of the spring is divided, to change which into working position the lever is moved down, stopping against the axle, as shown in Fig. 2, which carries the end of the spring past the dead-center line formed by the two ends of the spring, and the fulcrum of the lever relieving the suspension-chain to a looseness without restraint from the spring, at the same time the lever end of the spring being passed the dead-center line and the lever stopped, as it were, anchoring the spring. Then will the spring exert its force downwardly upon the cutters through the rearwardly-pulling strain or power upon the top ends of the uprights, which uprights, acting as a lever fulcrumed on the draft-bar, transmit a weight upon the cutters to the extent of the power of the springs, which may be, more or less, preferably, as about five hundred pounds weight upon the cutters, and as the machine is drawn forward, rotating the cutter-head, the cutters will strike the ground with the great force of the spring-weight upon their backs, in addition to the weight of the cutter-frame. Then when desired to elevate the cutters for turning corners or for moving from field to field, the lever is first lifted by the operator and then carried forward until its cross-arm meets and is stopped by the front rail of the cutter-frame. In this movement the spring transfers its force to elevating the cutters, as when the lever passes upwardly beyond the dead-center line the spring then exerts its force to draw the lever forward, taking up the slack in the suspension-chain, and carrying the arm to which the chain is connected up over and just forward of the fulcrum of the lever, elevating the cutters above the ground. In the movement elevating the cutters it will be observed that the uprights tilt forwardly, carrying the spring forward as the lever is moved forward, by which the spring is maintained in power, and it having sufficient force to overcome the weight of the cutter-frame, cutter-head, and cutters will elevate and hold them elevated, with no assistance of the operator other than to first pass the lever upwardly beyond the dead-center line. Then when desired to return to a working position the operator, by means of the cross-arm, moves the lever up and over rearwardly while overcoming the force of the spring until reaching the dead-center line. Then the spring reverses its force to a downward weight upon the cutters, having then returned to the working position.

It will be observed that the spring is complete in transferring its force from one purpose to the other, downwardly upon the cutters to elevating them, and vice versa. It will also be observed that by reason of the force of the spring upon the cutters when working, the machine may be of a light weight in construction, while maintaining great power of execution, thereby of less cost, a lighter draft, and greater ease in handling and operating than heretofore.

Having thus set forth my invention, I claim—

1. In a stalk-cutter having a carriage on wheels, with a cutter-frame carrying cutters pivotally connected therewith, the combination of the spring, lever, and suspension-chain, the spring adapted to force downwardly upon the cutters and have its force transferred therefrom to elevating and suspending the cutters above the ground, substantially as and for the purpose set forth.

2. In a stalk-cutter having a carriage, with a cutter-frame having cutters pivotally connected to said carriage, the combination of the spring, lever, and suspension-chain, the said spring having the double purpose, adapted to exert its force downwardly as an additional weight upon the cutters and transferring its force to assisting in elevating the cutters above the ground, substantially as and for the purpose set forth.

3. In a stalk-cutter having a carriage, with a cutter-frame pivotally connected to said carriage, the cutter-frame provided with arms extending upwardly above said pivotal connection, in combination with a spring attached to said arms above said pivotal connection, substantially as and for the purpose set forth.

4. In a stalk-cutter having a carriage, with a cutter-frame pivotally connected therewith, the cutter-frame provided with upwardly-extending arms, in combination with the lever and the spring, one end of the spring connected to the said lever, the other end connected to the said arms, substantially as and for the purpose set forth.

5. The combination, with the lever provided with the short arm, with the suspension-chain connected thereto, of the spring connected to the said lever above the fulcrum and adapted to pass the fulcrum in the movement of said lever, and the carriage-frame with the cutter-frame, substantially as and for the purpose set forth.

6. The combination of the lever provided with an arm extending below the fulcrum, the spring connected to the lever above the fulcrum, with the suspension-chain connected to the said arm and adapted to pass the fulcrum in the movement of the lever, and the carriage-frame with the cutter-frame, substantially as and for the purpose set forth.

7. The combination of the lever with the spring and the suspension-chain, the said spring and chain connected to said lever at opposite sides of the fulcrum and adapted to pass the dead-center in movements of the lever, and the carriage-frame with the cutter-frame, substantially as and for the purpose set forth.

8. The combination of the lever C, spring S, and axle B with the cutter-frame having uprights $a'$, substantially as and for the purpose set forth.

9. The combination of the lever C, spring S, and suspension-chain R with the cutter-frame having the rail $c$ and uprights $a'$, substantially as and for the purpose set forth.

JOSEPH P. BLACK.

Witnesses:
HARVEY L. BLACK,
WM. E. LUCAS.